US009550512B2

(12) United States Patent
Schioler et al.

(10) Patent No.: US 9,550,512 B2
(45) Date of Patent: Jan. 24, 2017

(54) TRANSPORT DEVICE FORMED FROM PLASTIC SHEET

(76) Inventors: Thomas Schioler, Winnipeg (CA); Paul Bundy, Winnipeg (CA)

(*) Notice: Subject to any disclaimer, the term of this patent is extended or adjusted under 35 U.S.C. 154(b) by 78 days.

(21) Appl. No.: 13/050,046

(22) Filed: Mar. 17, 2011

(65) Prior Publication Data
US 2011/0241300 A1    Oct. 6, 2011

Related U.S. Application Data

(60) Provisional application No. 61/320,104, filed on Apr. 1, 2010.

(51) Int. Cl.
B62B 13/00 (2006.01)
B62B 15/00 (2006.01)
A01M 31/00 (2006.01)
A22B 7/00 (2006.01)
A61G 1/01 (2006.01)

(52) U.S. Cl.
CPC .......... B62B 15/007 (2013.01); A01M 31/006 (2013.01); A22B 7/006 (2013.01); A61G 1/01 (2013.01)

(58) Field of Classification Search
CPC ...... B62B 13/00; B62B 15/007; B62B 5/0093; A01M 31/006
USPC ............ 280/18, 19, 20, 24; 5/628, 625, 627, 5/81.1 T
See application file for complete search history.

(56) References Cited

U.S. PATENT DOCUMENTS

| 3,145,400 | A | * | 8/1964 | Yoakum ......................... 280/18 |
| 3,336,060 | A | | 8/1967 | Bradford |
| 4,173,351 | A | | 11/1979 | Hetland |
| 5,104,133 | A | | 4/1992 | Reiner |
| 6,276,698 | B1 | | 8/2001 | Calandra |
| 6,565,101 | B2 | | 5/2003 | Jones, Jr. et al. |
| 6,871,368 | B2 | * | 3/2005 | Calkin ............................. 5/628 |
| 7,810,820 | B2 | * | 10/2010 | Wolf et al. ...................... 280/19 |
| 8,091,937 | B2 | * | 1/2012 | Mastromatto et al. ........ 294/152 |
| 8,172,238 | B2 | * | 5/2012 | Wolf et al. ....................... 280/19 |
| 2002/0195781 | A1 | * | 12/2002 | Jones et al. ..................... 280/19 |
| 2004/0088794 | A1 | | 5/2004 | Calkin |
| 2006/0061050 | A1 | | 3/2006 | Wolf et al. |
| 2009/0051132 | A1 | * | 2/2009 | Masterson et al. ............ 280/19 |

* cited by examiner

Primary Examiner — Hau Phan
(74) Attorney, Agent, or Firm — Adrian D. Battison; Ade & Company Inc.

(57) ABSTRACT

A simple device for transporting materials is formed of a sheet of a flexible plastics material of generally tear drop shape to define a front tapered converging portion connected directly to a rear semicircular cupping portion. A rope passes through a pair of transversely spaced holes at the front edge to define a forwardly extending handle portion. The rope extends rearwardly along each side of the front portion to a hole at or adjacent a rear edge of the side edge and is covered by a stiffening tube. The rope passes through holes at the rear cupping portion to define a rear portion of the rope outside the sheet across the rear covered by a stiffening tube engaged over the rear portion of the rope.

13 Claims, 6 Drawing Sheets

TRANSPORT DEVICE FORMED FROM PLASTIC SHEET

This application claims the benefit of priority under 35 USC 119 of Provisional Application 61/320,104 filed Apr. 1, 2010.

This invention relates to a transport device for carrying materials or items by dragging across the ground.

BACKGROUND OF THE INVENTION

It is known that materials to be transported can be placed on a sheet such as a tarpaulin dragged across the ground.

Attempts have been made to apply some technology to such a simple device so that the device can carry more material in a more stable manner. Many of those attempts are directed to specific end uses such as transporting human patients when injured on an easily transported stretcher. An example of such a device is shown in U.S. Design Pat. 421413 (Calkin) issued Mar. 7, 2000.

Other areas where devices of this type are proposed is in regard to transporting animals hunted in the wild since these must be carried back to a home base often from remote locations. A device of this type is shown in U.S. Pat. No. 7,810,820 (Wolf) originally published Mar. 23, 2006 as US 2006/0061050.

These devices are particularly concerned with initial portability to get to the remote location and in strapping the load effectively in place None of these devices has been designed to provide a simple inexpensive device to enable many different types of materials to be quickly loaded, transported and discharged as a simple alternative to a wheel barrow or the like.

SUMMARY OF THE INVENTION

It is one object of the invention to provide an improved transport device which is of a very simple inexpensive construction.

According to one aspect of the invention there is provided an apparatus for transporting materials comprising:
a sheet of a flexible plastics material;
a plurality of holes through the plastics material;
a rope for engaging through the holes in the sheet;
the sheet being shaped in flat plan to define a front tapered converging portion connected to a rear arcuate cupping portion;
the rope passing through at least one hole at the front of the converging portion to define a forwardly extending portion of the rope for pulling the sheet across the ground with the materials carried thereon;
the rope passing through a series of holes at the rear cupping portion to define portions of the rope outside the sheet so that a pulling force on the rope acts to pull the arcuate cupping portion inwardly so as to confine the materials on the cupping portion.

Preferably the rear cupping portion is generally semi-circular in flat plan.

Preferably the front converging portion extends forwardly from a front end of the rear arcuate cupping portion such that the sheet in flat plan is formed substantially wholly by the arcuate rear cupping portion and the tapered front portion.

Preferably the sheet is generally tear drop shape in flat plan.

Preferably the front converging portion includes substantially straight sides edges diverging outwardly and rearwardly.

Preferably the front converging portion includes on each side a front hole adjacent the front edge and a rear hole adjacent the front edge of the rear cupping portion so that the rope extends along substantially the full length of the edge.

Preferably there is provided a pair of stiffening tubes each surrounding the rope and extending along a respective side edge of the front converging portion.

Preferably the stiffening tubes and the rope are arranged along a top surface of the sheet.

Preferably the stiffening tubes extend along a full length of the rope between holes.

Preferably there is provided a pair of stiffening tubes each for surrounding the rope along a respective side edge of the front converging portion.

Preferably there is provided a rear stiffening tube surrounding the rope along the rear side of the rear cupping portion.

Preferably the rear stiffening tube extends along a full length of the rope between holes.

Preferably the rear stiffening tube extends across at least substantially one half of the width of the rear cupping portion.

Preferably the front converging portion has a front edge and there are two transversely spaced holes at the front edge to define two portions of rope extending forwardly from the front edge.

Preferably there is provided at each of the front and rear of the sheet a respective one of two rope handles each defined by a portion of rope between two holes.

According to a second aspect of the invention there is provided an apparatus for transporting materials comprising:
a sheet of a flexible plastics material;
a plurality of holes through the plastics material;
a rope for engaging through the holes in the sheet;
the sheet being shaped in flat plan to define a front tapered converging portion connected to a rear cupping portion;
the front converging portion including a front edge and two side edges extending rearwardly and outwardly to a rear end thereof;
the rear cupping portion having a curved rear edge connected at forward ends thereof to the rear end of the side edges;
the rope passing through a pair of transversely spaced holes at the front edge of the converging portion to define a forwardly extending portion of the rope for pulling the sheet across the ground with the materials carried thereon;
the rope extending rearwardly along each side of the front portion to a hole at or adjacent a rear edge of the side edge;
a pair of stiffening tubes each engaged over the rope along each side edge;
the rope passing through a plurality of holes at the rear cupping portion to define a rear portion of the rope outside the sheet across the rear so that a pulling force on the rope acts to pull the rear of the cupping portion forwardly so as to confine the materials on the cupping portion;
and a stiffening tube engaged over the rear portion of the rope.

Preferably the two side edges and the stiffening tubes extend rearwardly and outwardly over a distance at least of the order of half of the length of the sheet.

Preferably the rear portion of rope extends and the tube thereon across a distance at least of the order of half of the width of the sheet.

The term "rope" as used herein is not indented to provide any limitation as to a shape or material of the rope since it dos not need to be formed of fibers or to be circular in cross-section.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
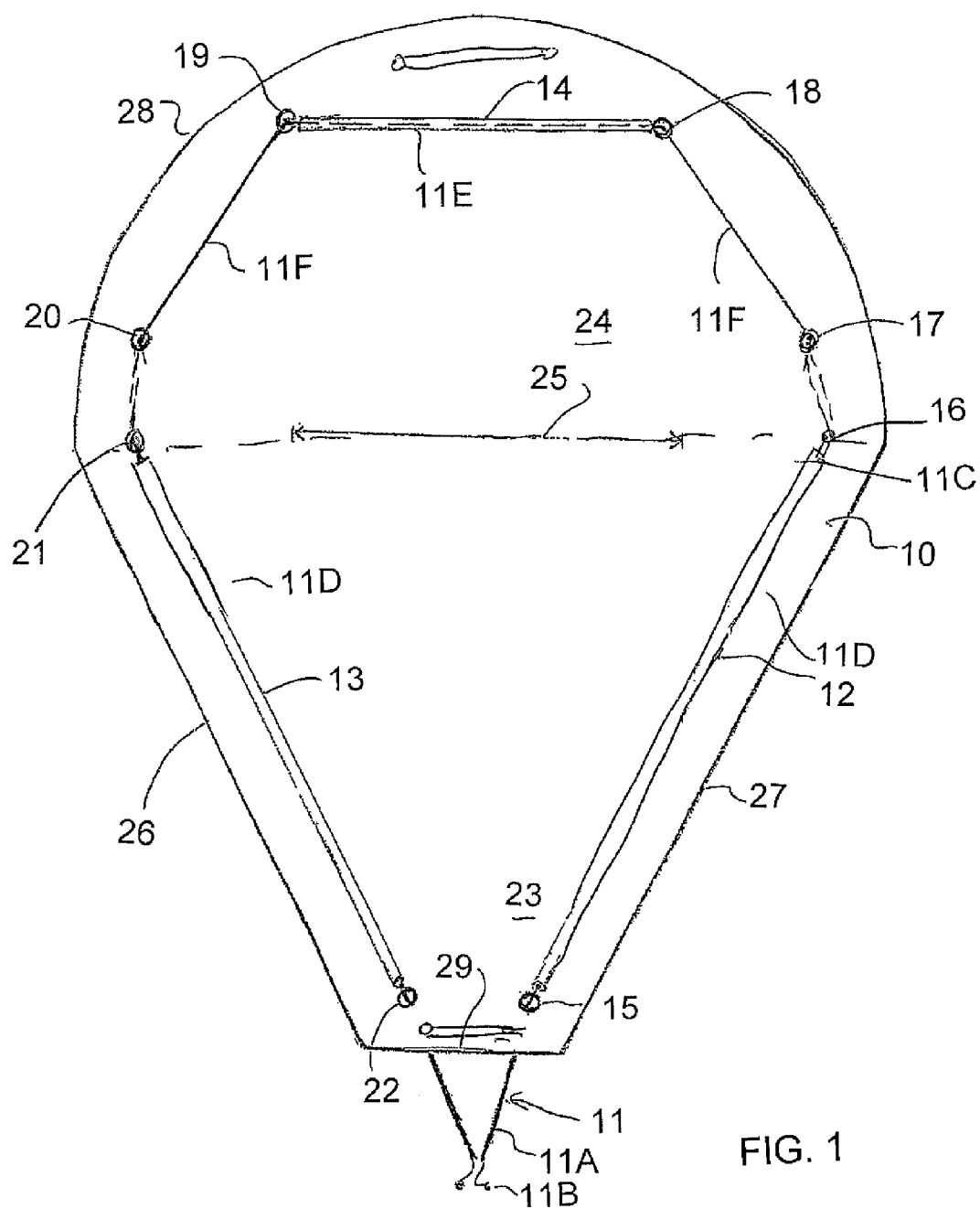
FIG. 1 is a top plan view of the apparatus according to the present invention showing the locations of the components.
Figure 2:
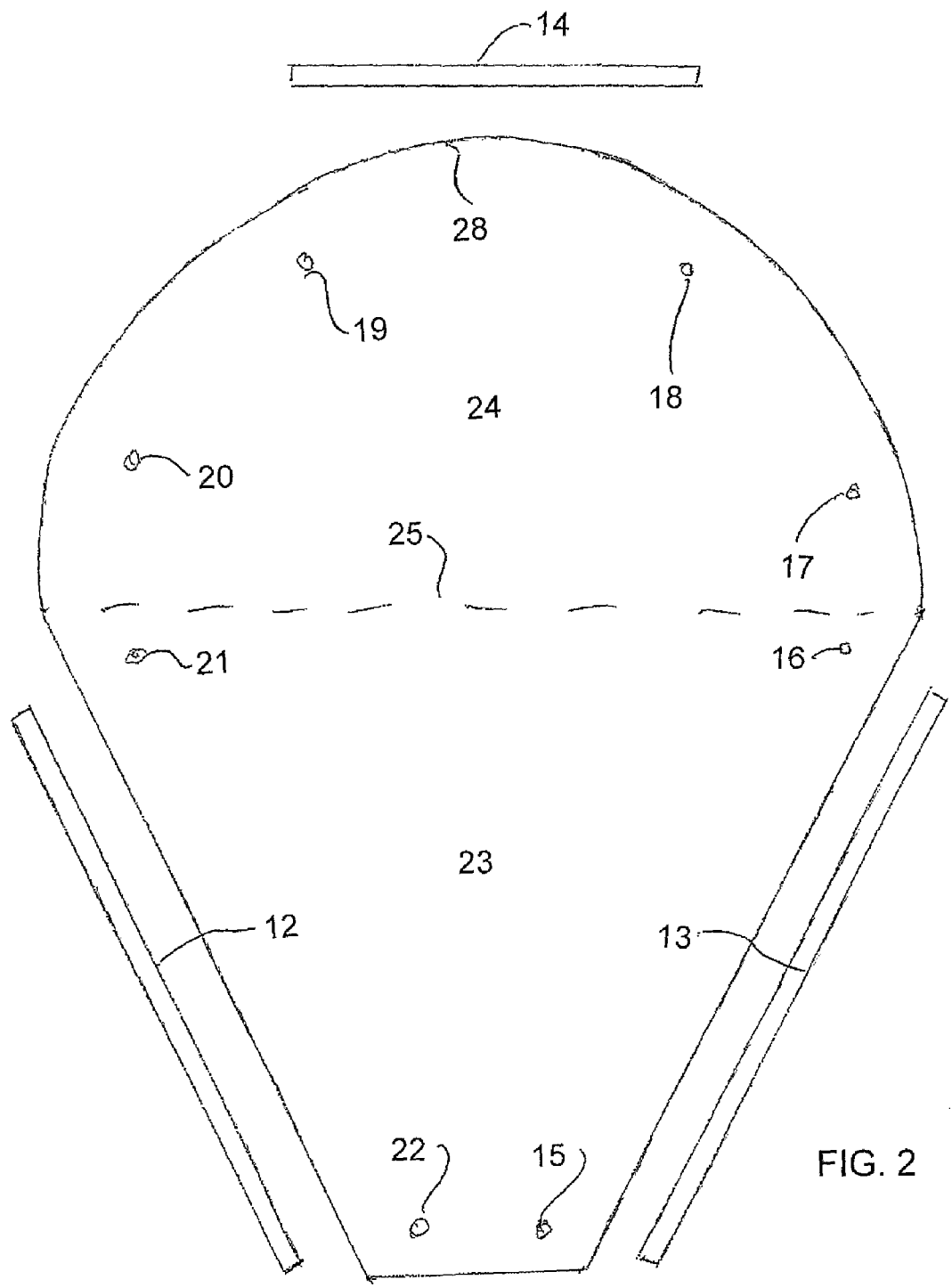
FIG. 2 is a top plan view of the apparatus of FIG. 1 showing the shape of the flat blank of the plastic sheet.
Figure 3:
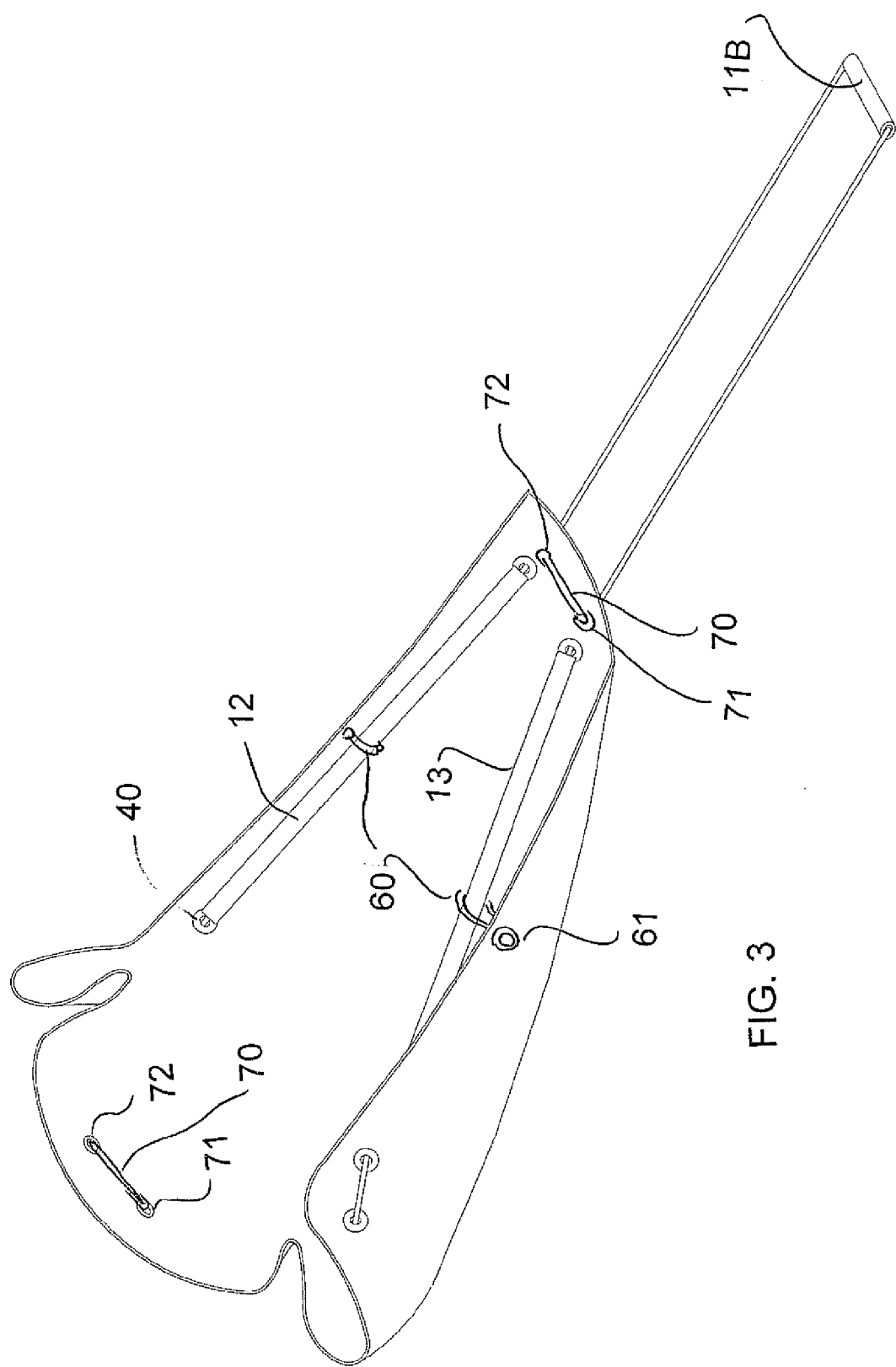
FIG. 3 is an isometric view of the apparatus of the apparatus of FIG. 1 showing the sheet in the pulled cupped position for transporting the materials.
Figure 4:
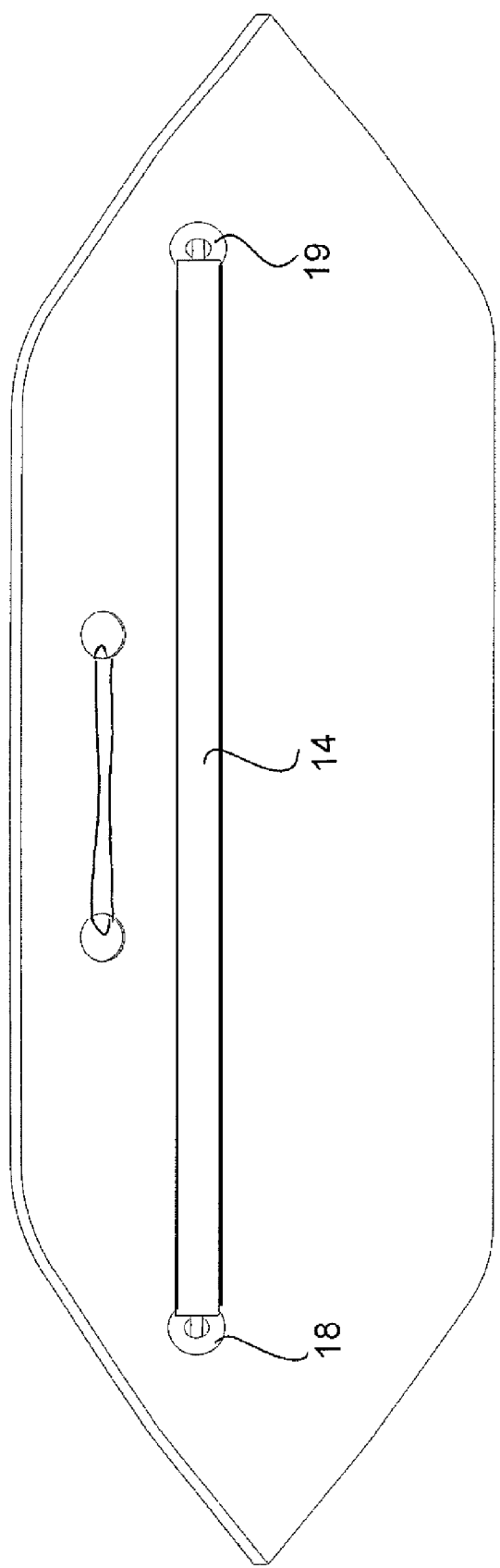
FIG. 4 is a rear elevational view of the apparatus of FIG. 1.
Figure 5:
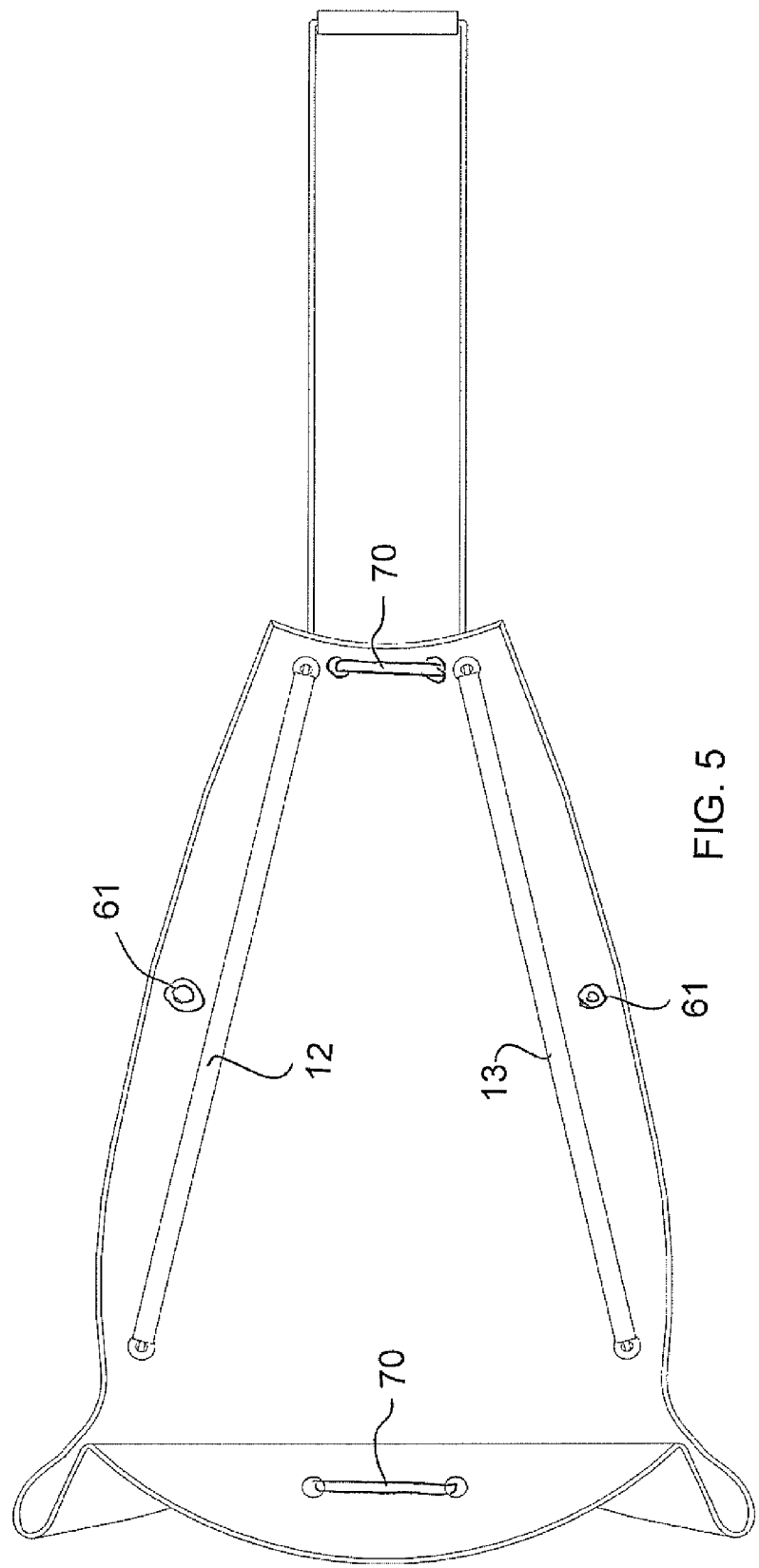
FIG. 5 is a top plan view of the apparatus of FIG. 1 showing apparatus in the pulled cupped position for transporting the materials.
Figure 6:
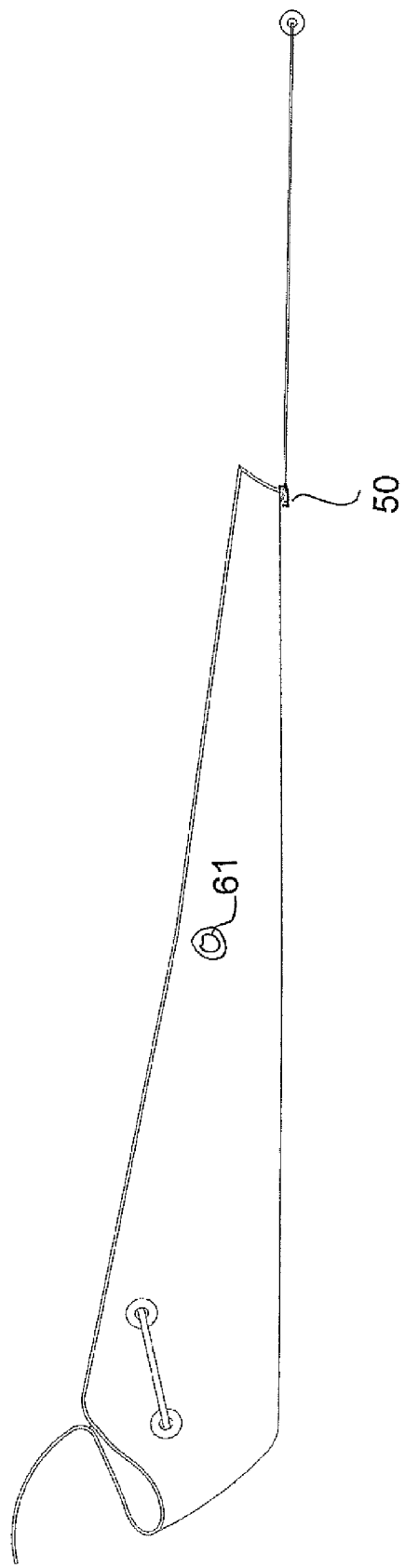
FIG. 6 is a side elevational view of the apparatus of FIG. 1 showing apparatus in the pulled cupped position for transporting the materials.

Apparatus for transporting materials includes a sheet of a flexible plastics material which is flat in a supplied rest condition. The material is a high density polyethylene plastic of typically 1/32 to 1/16 inch in thickness. This material is flexible so that it can be bent or rolled and is of low friction when sliding over a surface. It is also suffiently strong that it is difficult to tear under pulling loads by a human or small pulling vehicle such as an ATV.

The apparatus also includes a rope 11 and a pair of tubes 12 and 13. The apparatus can also include an optional tube 14.

The sheet has plurality of holes 15 to 22 through the plastics material. The rope is arranged for engaging through the holes in the sheet.

The sheet is shaped to define a front converging portion 23 and a rear cupping portion 24 which are formed integrally with an imaginary dividing line 25. The rear cupping portion is generally semi-circular in plan when in a flat condition defining a semi-circular rear edge 28. The front converging portion is generally triangular in plan extending forwardly from a front end of the rear cupping portion at the dividing line 25. Thus the sheet is generally tear drop shape in plan when in a flat condition. The front edge 29 is relatively narrow compared to the line 25 but has a width sufficient to receive the holes 15 and 22 spaced apart across the front edge.

The front converging portion includes substantially straight side edges 26 and 27 diverging outwardly and rearwardly to connect to a front edge of the rear cupping portion.

The rear cupping portion includes on each side two holes 17, 18 and 19, 20. The front converging portion includes on each side a front hole 15, 22 adjacent the front edge and a rear hole 16, 21 at or adjacent the line 25 at the front edge of the rear cupping portion.

The rope 11 passes through the holes 15 and 22 at the front of the converging portion to define a forwardly extending portion 11A of the rope having the two ends 11B for pulling the sheet across the ground with the materials carried thereon. The rope extends through the holes 15, 22 so as to define portions 11D which extend along substantially the full length of the edge 26, 27 on the top surface of the front converging portion 23.

The rope passes through the holes 16, 21 at the front of the rear cupping portion to define portions 11C of the rope outside the sheet so that a pulling force on the rope acts to pull the cupping portion inwardly so as to confine the materials on the cupping portion.

The portions of the rope outside the cupping portion include the portions 110 on each side to pull the side inwardly and at least one rear portion 11E to pull the rear forwardly. The rope includes portions 11F on the inside so that the holes locate the rope for the inward pulling action.

Thus the holes are arranged to define at each side an exit hole 16, 21 for the rope to allow the side portion 11C of the rope to be located outside and an entrance hole 17, 20 to allow the rope to re-enter the inside of the cupping portion at portions 11F.

Thus the holes are arranged to define at the rear two exit holes 16, 18 for the rope to allow the rear portions of the rope to be located outside the cupping portion.

There is also provided the pair of stiffening tubes 12, 13 each for surrounding the rope portion 11D along a respective side edge of the front converging portion. These help in preventing the sheet from collapsing longitudinally so that the side edges 26 and 27 remain substantially flat and prevent twisting of the sheet when pulled.

The stiffening tube 14 is arranged for surrounding the rope along the rear side of the rear cupping portion at the rope portion 11E to hold also the portion between the holes 18 and 19 flat to prevent buckling in this area.

The rear cupping portion can be scored or creased or weakened for example at the score lines S1 to S4 to cause creasing along desired lines to effect the cupping action.

In order to provide effective stability of the structure and to avoid rolling of the materials on the sheet when pulled, the two side edges and the stiffening tubes 12, 13 extend rearwardly and outwardly over a distance of the order of half of the length of the sheet. That is the holes 16 and 21 are preferably located at the junction line 25 between the front and cupping portions. Also the rear portion of rope extends and the tube 14 thereon extends across a distance between the holes 18 and 19 of the order of half of the width of the sheet.

Each hole is strengthened by a suitable grommet 40. In front of the holes 15 and 22, the rope is located by a rope lock 50 to maintain the tension required to form the cupping action. The tubes 12 and 13 can be located at the center of each by a rope loop 60 threaded through a hole 61 in the sheet. At the front and rear, a transverse rope handle 70 can be added for assisting in handling of the sheet. The rope handle is threaded through spaced holes 71 and 72.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. Apparatus for transporting materials comprising:
a sheet of a flexible plastics material;
a plurality of holes through the plastics material;
a rope for engaging through the holes in the sheet;
the sheet being shaped in flat plan to define a tapered front converging portion connected to a rear arcuate cupping portion and extending to a front edge;
the rope passing through at least one hole at the front of the converging portion to define a forwardly extending portion of the rope for pulling the sheet across the ground with the materials carried thereon;

the rope passing through a series of holes at the rear cupping portion to define portions of the rope outside the sheet so that a pulling force on the rope acts to pull the arcuate cupping portion inwardly so as to confine the materials on the cupping portion;

wherein the front converging portion includes adjacent each side edge of the front converging portion at least a front hole adjacent the front edge and a rear hole adjacent a front edge of the rear cupping portion so that the rope extends along substantially the full length of the side edge;

and wherein there is provided a pair of stiffening tubes each surrounding the rope and extending along a respective side edge of the front converging portion.

2. The apparatus according to claim 1 wherein the rear cupping portion is generally semi-circular in flat plan.

3. The apparatus according to claim 1 wherein the front converging portion extends forwardly from said front edge of the rear arcuate cupping portion such that the sheet in flat plan is formed substantially wholly by the arcuate rear cupping portion and the tapered front converging portion.

4. The apparatus according to claim 1 wherein the sheet is generally tear drop shape in flat plan.

5. The apparatus according to claim 1 wherein the stiffening tubes and the rope are arranged along a top surface of the sheet.

6. The apparatus according to claim 1 wherein the stiffening tubes extend along a full length of the rope between holes.

7. The apparatus according to claim 1 wherein there is provided a rear stiffening tube surrounding the rope along the rear side of the rear cupping portion.

8. The apparatus according to claim 7 wherein the rear stiffening tube extends along a full length of the rope between holes.

9. The apparatus according to claim 7 wherein the rear stiffening tube extends across at least substantially one half of the width of the rear cupping portion.

10. The apparatus according to claim 1 wherein there is provided at each of the front and rear of the sheet a respective one of two rope handles each defined by a portion of rope between two holes.

11. Apparatus for transporting materials comprising:
a sheet of a flexible plastics material;
a plurality of holes through the plastics material;
a rope for engaging through the holes in the sheet;
the sheet being shaped in flat plan to define a tapered front converging portion connected to a rear cupping portion;
the front converging portion including a front edge and two side edges extending rearwardly and outwardly to a rear end thereof;
the rear cupping portion having a curved rear edge connected at forward ends thereof to the rear end of the side edges;
the rope passing through a pair of transversely spaced holes at the front edge of the converging portion to define a forwardly extending portion of the rope for pulling the sheet across the ground with the materials carried thereon;
the rope extending rearwardly along each side of the front portion to a hole at or adjacent a rear edge of the side edge;
a pair of stiffening tubes each engaged over the rope along each side edge;
the rope passing through a plurality of holes at the rear cupping portion to define a rear portion of the rope outside the sheet across the rear so that a pulling force on the rope acts to pull the rear of the cupping portion forwardly so as to confine the materials on the cupping portion;
and a stiffening tube engaged over the rear portion of the rope.

12. The apparatus according to claim 11 wherein the two side edges and the stiffening tubes extend rearwardly and outwardly over a distance at least of the order of half of the length of the sheet.

13. The apparatus according to claim 11 wherein the rear portion of rope extends and the tube thereon across a distance at least of the order of half of the width of the sheet.

* * * * *